April 29, 1930.  C. SCHNEIDER  1,756,389
SIGN SUPPORTING FRAME
Filed April 3, 1929
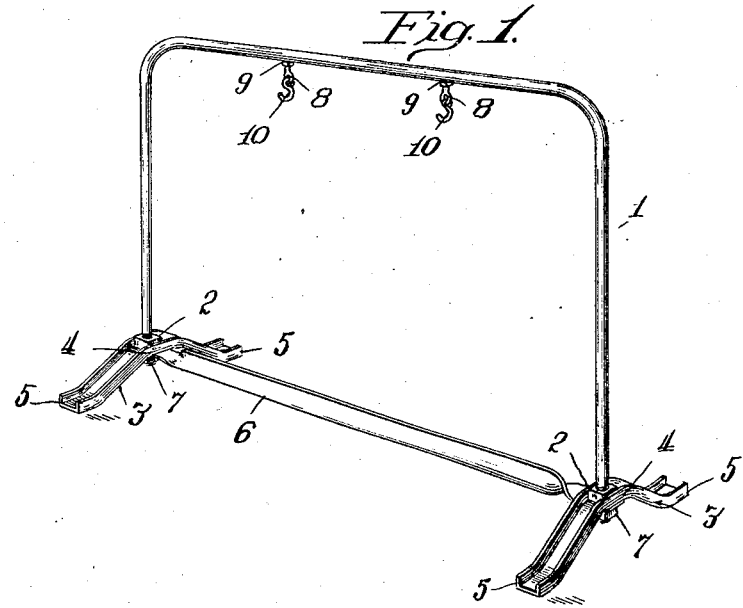
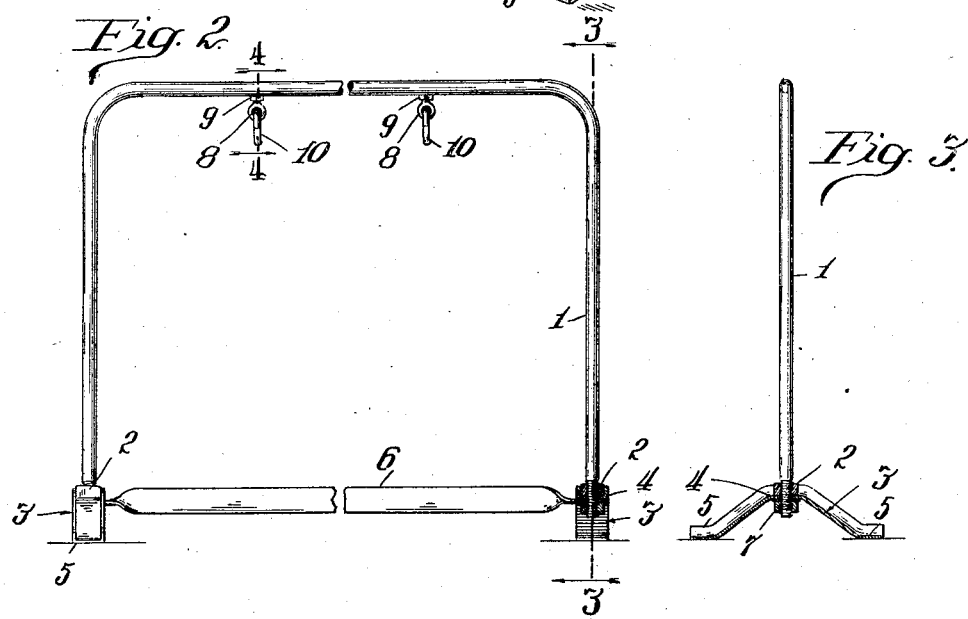
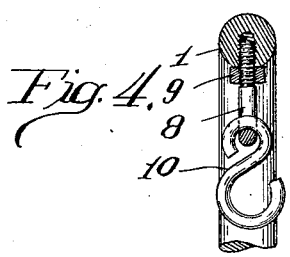
Inventor
Christian Schneider
By Rudolph Wm Lotz
Attorney Patented Apr. 29, 1930

1,756,389

UNITED STATES PATENT OFFICE

CHRISTIAN SCHNEIDER, OF CHICAGO, ILLINOIS

SIGN-SUPPORTING FRAME

Application filed April 3, 1929. Serial No. 352,076.

This invention has for its object to provide a simple, durable and efficient sign-support adapted particularly for supporting so-called "side-walk" signs.

A further object of the invention is to provide a sign-support of the type referred to which is capable of being quickly and easily assembled and is therefore, particularly adapted for shipment in disassembled or "knocked-down" condition.

The preferred embodiment of the invention is illustrated in the accompanying drawings wherein:

Fig. 1 is a perspective view of a sign-support constructed in accordance with the invention.

Fig. 2 is a front elevation of the same, partly in section.

Fig. 3 is a vertical section of the same on the line 3—3 of Fig. 2.

Fig. 4 is a fragmentary detail sectional view on the line 4—4 of Fig. 2.

The sign-support comprises an inverted U-shaped member 1 preferably made of conventional metal piping or tubing and having externally threaded end portions each of which is equipped with a nut 2 tightly engaged therewith and constituting collars or stop formations.

The member 1 is mounted upon supporting base-members 3, each comprising a strip of conventional channel iron bent to provide a flat middle and flat end portions 4 and 5 respectively, the middle portion 4 being offset upwardly from the end portions 5 and the intermediate portions of the strip 3 being inclined relatively to the middle and end portions.

The side flanges of the strip 3 extend upwardly, the nuts 2 being of such diameter as to fit snugly between the flanges of the strips 3, said nuts being so positioned on the member 1 as to present side faces extending at right angles to the axis of the top portion or supporting bar portion of the member 1. Said nuts thus serve to determine the position of the supports 3 with respect to the supporting bar portion of the member 1 and cause said supports to extend at right angles to said supporting bar portion and parallel with each other.

A cross brace 6 consisting preferably of a narrow strip of bar iron or steel having its end portions twisted or distorted to extend perpendicularly to its middle portion, is provided. The end portions of the brace 6 are provided with openings to permit passage therethrough of the threaded extremities of the member 1. Nuts 7 on said extremities serve to clamp the end portions of said brace 6 against the lower faces of the middle portions 5 of the supports 3 and to clamp the latter against the nuts 2 to thus rigidly associate the member 1 and brace 6 with the supports 3.

The supporting bar portion of the member 1 is provided in its lowermost portion with threaded openings to receive the threaded shanks of eye-bolts 8 on which lock-nuts 9 are mounted for obvious reasons, the eye-bolts being equipped with hooks 10 for supporting a sign.

The supports 3 are relatively wide and heavy so as to render the structure hard to tip under the influence of strong winds and, obviously, the structure is very easily assembled and disassembled.

The member 1 may, of course, be of any desired ornamental design if desired as, for example, ornamental wrought iron presenting scroll work or the like.

I claim as my invention:

1. A sign support comprising supporting members each consisting of a piece of conventional channel-bar having a flat middle portion and flat end portions, the middle portion being offset upwardly from the end portions and provided with a central opening, an inverted U-shaped sign supporting member having threaded extremities adapted to pass through said openings, a collar on each of said threaded extremities having flat side faces adapted to engage the flanges of the supporting members to hold the latter in predetermined position relatively to the U-shaped member and to rest upon the middle portions of said supporting members to support said U-shaped member thereon, and nuts on the extremities of the latter below the middle portions of said supporting members for rigidly clamping the latter against said collars.

2. A sign support comprising supporting members each consisting of a piece of conventional channel-bar having a flat middle portion and flat end portions, the middle portion being offset upwardly from the end portions and provided with a central opening, an inverted U-shaped sign supporting member having threaded extremities adapted to pass through said openings, a collar on each of said threaded extremities having flat side faces adapted to engage the flanges of the supporting members to hold the latter in predetermined position relatively to the U-shaped member and to rest upon the middle portions of said supporting members to support said U-shaped member thereon, a brace member having openings in its ends to receive the threaded extremities of the U-shaped member, and nuts on the extremities of the latter below the middle portions of said supporting members for rigidly clamping the said brace and said supports against each other and said collars.

3. A sign support comprising supporting members each consisting of a piece of conventional channel-bar having a flat middle portion and flat end portions, the middle portion being offset upwardly from the end portions and provided with a central opening, an inverted U-shaped sign supporting member having threaded extremities adapted to pass through said openings, a collar on each of said threaded extremities having flat side faces adapted to engage the flanges of the supporting members to hold the latter in predetermined position relatively to the U-shaped member and to rest upon the middle portions of said supporting members to support said U-shaped member thereon, a brace member consisting of a strip of bar iron having its end portions twisted to extend perpendicularly to its middle portion and provided with openings to receive the extremities of the U-shaped member, and nuts on said extremities engaging the lower faces of the end portions of the brace for clamping the latter and said supports between said collars and said nuts.

CHRISTIAN SCHNEIDER.